United States Patent [19]

Tamada et al.

[11] Patent Number: 5,729,717
[45] Date of Patent: Mar. 17, 1998

[54] IC CARD AND ISSUING APPARATUS ALLOWING MULTIPLE APPLICATIONS

[75] Inventors: Masuo Tamada, Yokohama; Hitoshi Kokuryo, Sagamihara; Shinsuke Tamura; Hiroshi Ozaki, both of Yokohama, all of Japan

[73] Assignee: Kabushiki Kaisha Toshiba, Kawasaki, Japan

[21] Appl. No.: 479,462

[22] Filed: Jun. 7, 1995

Related U.S. Application Data

[63] Continuation of Ser. No. 979,432, Nov. 20, 1992, abandoned, which is a continuation of Ser. No. 717,175, Jun. 18, 1991, abandoned, which is a continuation of Ser. No. 506,562, Apr. 9, 1990, abandoned, which is a continuation of Ser. No. 288,871, Dec. 23, 1988, abandoned, which is a division of Ser. No. 696,099, Jan. 29, 1985, abandoned.

[30] Foreign Application Priority Data

Jan. 31, 1984 [JP] Japan .................................. 59-15489

[51] Int. Cl.$^6$ ...................................... G06F 12/00
[52] U.S. Cl. ........................ 395/491; 395/800; 235/380; 380/4
[58] Field of Search ...................... 395/828, 882, 395/884, 885, 892, 427, 474, 480, 825, 835, 842, 856, 282, 438, 456, 490, 491, 497.04, 600, 726, 800; 340/825.31, 825.32, 825.3, 825.33, 825.34; 380/3, 4; 235/379, 380–382, 382.5

[56] References Cited

U.S. PATENT DOCUMENTS

| | | | |
|---|---|---|---|
| 3,377,624 | 4/1968 | Nelson et al. | 395/425 |
| 3,846,622 | 11/1974 | Meyer | 235/382 |
| 4,095,739 | 6/1978 | Fox et al. | 235/382 |
| 4,148,012 | 4/1979 | Baump et al. | 340/825.32 |
| 4,204,113 | 5/1980 | Giraud et al. | 235/375 |
| 4,211,919 | 7/1980 | Ugon | 235/488 X |
| 4,377,853 | 3/1983 | Dockal | 395/885 |
| 4,392,207 | 7/1983 | Dockal | 395/884 |
| 4,584,639 | 4/1986 | Hardy | 364/200 |

FOREIGN PATENT DOCUMENTS

| | | |
|---|---|---|
| 0057602 | 8/1982 | European Pat. Off. |
| 0058029 | 8/1982 | European Pat. Off. |
| 0064779 | 11/1982 | European Pat. Off. |
| 52-7646 | 1/1977 | Japan. |
| 57-25060 | 2/1982 | Japan. |
| 58-209000 | 12/1983 | Japan. |
| 8303694 | 10/1983 | WIPO. |

OTHER PUBLICATIONS

Sutton et al., "Processors Sharing and Partitioning of Main Storage in the MP System", IBM Technical Disclosure Bulletin, Oct. 1979, pp. 2009–2010.
"The Concept of a Multipurpose (Microcircuit) Card", Chip Card News, Dec. 1982, p. 6.
"Security Aspects in a Chip Card POS Payment System", Chip Card News, Apr. 1983, p. 5.
Baer JL, "Computer System Architecture" Computer Science Press 1980, pp. 296–309.

*Primary Examiner*—Alpesh M. Shah
*Attorney, Agent, or Firm*—Cushman, Darby & Cushman IP Group of Pillsbury Madison & Sutro LLP

[57] ABSTRACT

A card contains an IC chip having a CPU, a memory, etc. When the card is inserted into a terminal device, it is connected to a host computer. Under this condition, the data in the memory of the IC card is processed by the host computer. The memory is manufactured in such a way that the memory area is segmented into a plurality of zones. An access controller for the memory is provided in the IC chip. In issuing the card, the access condition of each zone (for example, an assortment of access people and/or a type of access terminal) is programmed into the access controller by a card issuer.

18 Claims, 3 Drawing Sheets

IC CARD AND ISSUING APPARATUS ALLOWING MULTIPLE APPLICATIONS

This is a continuation of application Ser. No. 07/979,432, filed on Nov. 20, 1992, which was abandoned upon the filing hereof which is a continuation of Ser. No. 07/717,175 filed Jun. 18, 1991, which is a continuation of Ser. No. 07/506,562 filed Apr. 9, 1990, which is a continuation of Ser. No. 07/288,871 filed Dec. 23, 1988, which is a divisional of Ser. No. 06/696,099 filed Jan. 29, 1985, all now abandoned.

BACKGROUND OF THE INVENTION

The present invention relates to a portable data storing/processing device such as an IC card having a control circuit, e.g. CPU, and a memory.

A banking organ such as a bank has used a so called cash card with an account number by which money can be deposited or withdrawn without a bankbook. In order to prevent another person from illicitly using the card, a password is stored in the cash card for checking whether or not the user is the real owner of the card. A magnetic stripe memory is used for the memory of the cash card. In this type of the memory, the data stored is easily read. In this respect, the memory has an insufficient protecting function against the read out of data by another person. This gives rise to illicit use of the cash card.

To cope with this problem, a portable data storing/processing device, such as an IC card, has been developed. In this device, a semiconductor memory of which the data can not be seen from the exterior is included. In this type of IC card, it is necessary to divide the memory area into an accessible zone and an inaccessible zone for a certain people and a certain machine in accordance with the data to be stored. The size and location of the zone in the memory area are properly set in accordance with the issuer of the IC card or the system using the IC card. For this reason, the card maker must individually manufacture the cards prepared for the card issuers and the systems. In the conventional IC card, the password is usually checked. However, in some cases, the password check is not required. Furthermore, the data is output from the IC card being encrypted in accordance with the importance of the data. To meet such a requirement, the card maker must manufacture additional IC cards not requiring the password check or requiring the data encryption.

Thus, the conventional IC card lacks versatility in use, and has a high manufacturing cost.

The above description, which relates to a card like portable data storing/processing device, is also applicable to a coin like device, and any other portable means (e.g. a ball point pen or a wristwatch) having such a device assembled therein.

SUMMARY OF THE INVENTION

Accordingly, an object of the present invention is to provide a portable data storing/processing device which is versatile in use and low in cost to manufacture.

To achieve the above object, there is provided a portable data storing/processing device which is connectable through a terminal device to a main data processing device, comprising a portable main body, a memory of which memory area is segmented into a plurality of zones for storing data supplied to the main body, and an access controller for storing an access condition for each zone of the memory means to control the access to each zone.

DETAILED DESCRIPTION OF THE PREFERRED EMBODIMENTS

Figure 1:
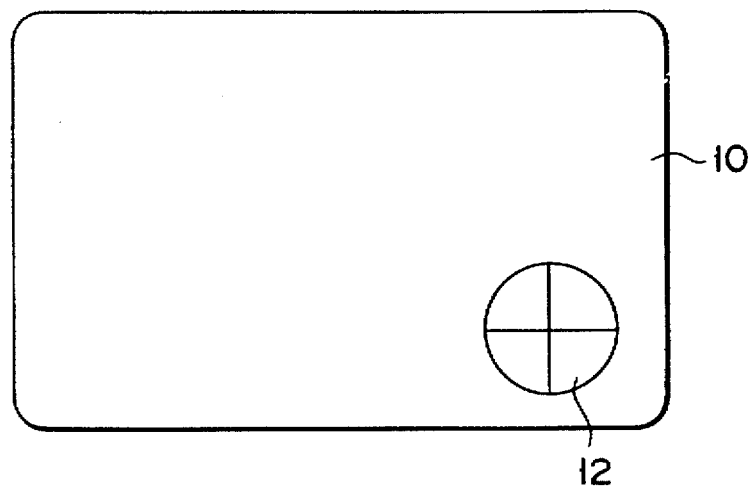
FIG. 1 is a plan view of an IC card which is an embodiment of a portable data storing/processing device according to the present invention.

A preferred embodiment of a portable data storing/processing device according to the present invention will be described referring to the accompanying drawings. In the present embodiment, the portable data storing/processing device is shaped like a card. FIG. 1 shows a plan view of a so called IC card which is a first embodiment of the present invention. An IC chip to be given later is contained in a card 10 made of plastic, for example. A connector 12 is provided on the surface of the card 10. When the card 10 is inserted into a card issuing apparatus or a user terminal device (in banks, an automatic cash depositing/withdrawing machine), the connector 12 connects the IC chip with such a device.

Figure 2:
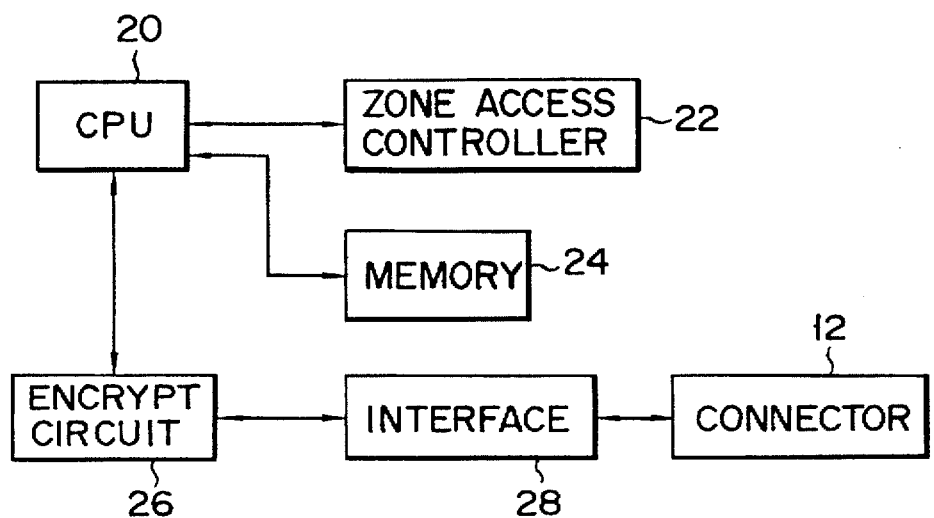
FIG. 2 is a block diagram of a circuit of an IC chip contained in the IC card.

FIG. 2 is a block diagram of an electric circuit in the IC chip contained in the card 10. The IC chip includes a CPU 20, a zone access controller 22, a memory 24, an encrypt circuit 26 and an interface 28. The interface 28 is connected to the connector 12 on the card surface. The memory 24 is an EEPROM for storing a control program for the CPU 20, and data. Its memory area is segmented into a plurality of zones. The zone access controller 22 is also an EEPROM, and stores a password and an access condition for each zone of the memory 24 in the form of a zone access table as given in the following table. The unit of zone size is byte.

TABLE 1

| Zone No. | Head address | Zone size | Access person flag A | Terminal flag B | Output condition flag C |
|---|---|---|---|---|---|
| 1 | 00000000 | 10 | 11000000 | 10000000 | 10000000 |
| 2 | 00000100 | 100 | 01100000 | 11100000 | 01000000 |
| 3 | 00001000 | 100 | 00100000 | 00100000 | 01000000 |
| 4 | 00001100 | 100 | 00100000 | 00100000 | 00000000 |
| ... | ... | ... | ... | ... | ... |

An access person flag A (A1, A2, A3, A4, ..., A8), a terminal flag B (B1, ..., B8), and an output condition flag C (C1, ..., C8) each consists of 8-bit data. Each bit of the access person flag A indicates a card accessible condition for each access person. If the bit is "1", the card is accessible by that access person. If it is "0", the card is inaccessible by that access person. In this embodiment, the bits A1, A2 and A3 of the access person flag respectively correspond to a card maker, a card issuer, and a card owner. The bits of the terminal flag B indicate an access condition for each terminal device, respectively. If the bit is "1", the card is accessible by that terminal. If it is "0", the card is inaccessible by that terminal. The bits B1, B2 and B3 of the terminal flag B correspond to a card issuing apparatus, an updating apparatus (reissuance of an expired card is called an "update"), and a user terminal, respectively. In the output condition flag, only the bits C1 and C2 are valid. If the bit C1 is "1", it indicates an indirect encryption of data. If the bit C2 is "1", it indicates a direct encryption. If both the bits are "0", the data is output without being encrypted. Direct encryption of data means that the data is encrypted by an encrypt key generator in the IC card. Indirect encryption means that the data is encripted by an encrypt key generator in the terminal device, not in the IC card.

The access person flag A, the terminal flag B and the output condition flag C are tabulated below. In the table, sign "–" indicates invalid data.

TABLE 2

|  | 1st bit | 2nd bit | 3rd bit | 4th | 5th | 6th | 7th | 8th |
|---|---|---|---|---|---|---|---|---|
| Access person flag A | Maker | Issuer | Owner | — | — | — | — | — |
| Terminal flag B | Card issuing apparatus | Updating apparatus | User terminal | — | — | — | — | — |
| Output condition flag C | Indirect encrypt | Direct encrypt | — | — | — | — | — | — |

From Table 2, the zone access table shown in Table 1 can be interpreted in the following way. In Table 1, the zone No. 1 is accessible only when the maker or the issuer operates the card issuing apparatus. The data in the zone is indirectly encrypted and output. The zone No. 2 is accessible only when the issuer or the owner operates the card issuing apparatus, the updating apparatus, or the user terminal device. The data in this zone is directly encrypted and output. The zone No. 3 is accessible only when the owner uses the user terminal device. The data in this zone is directly encrypted and output. The zone No. 4 is accessible only when the owner operates the user terminal device. The data in this zone is output without being encrypted. In this case, the access person is identified by a password.

Figure 3:
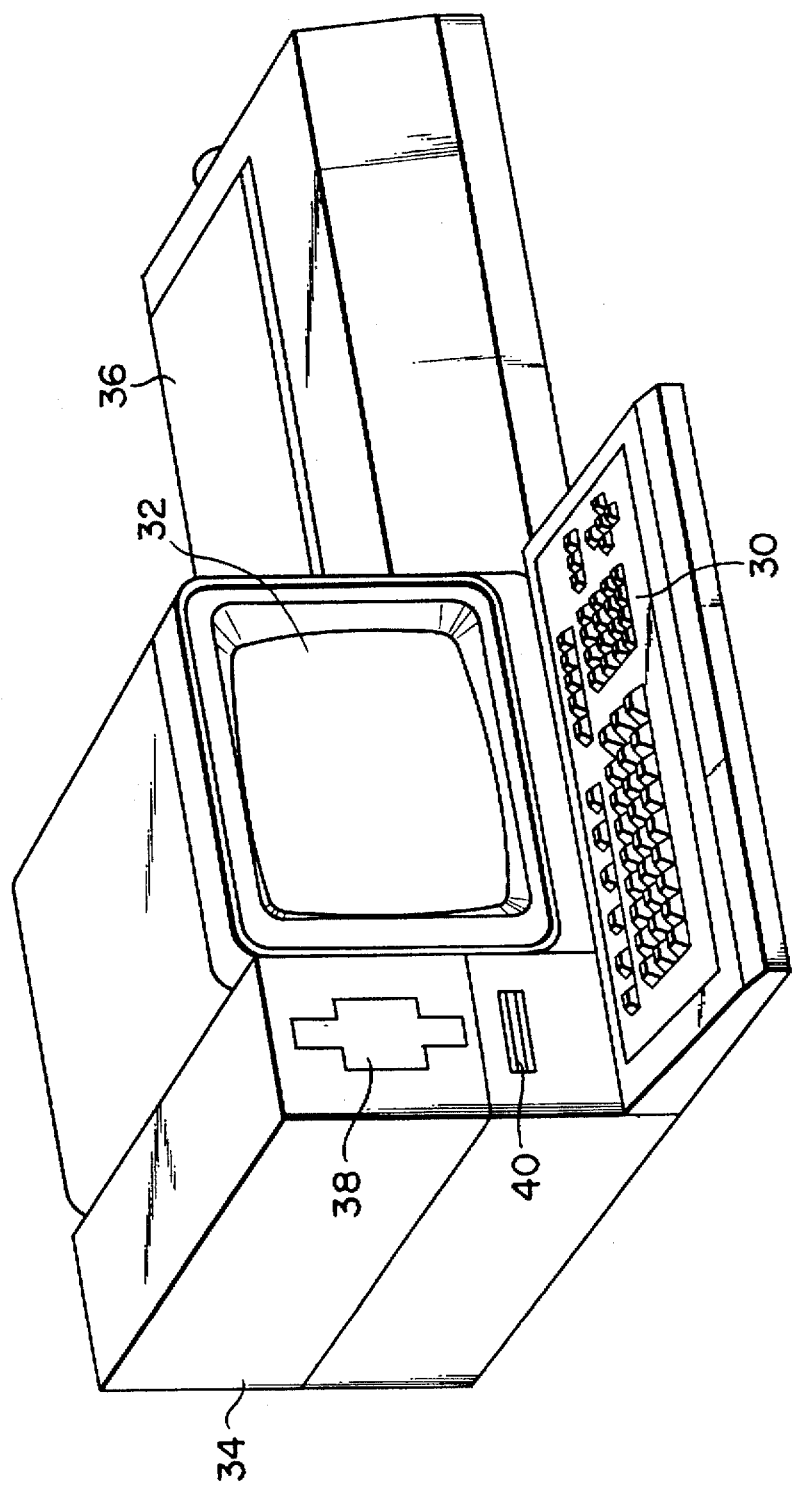
FIG. 3 is a perspective view of a card issuing apparatus for writing predetermined data into the IC card and issuing a card with the written data.
Figure 4:
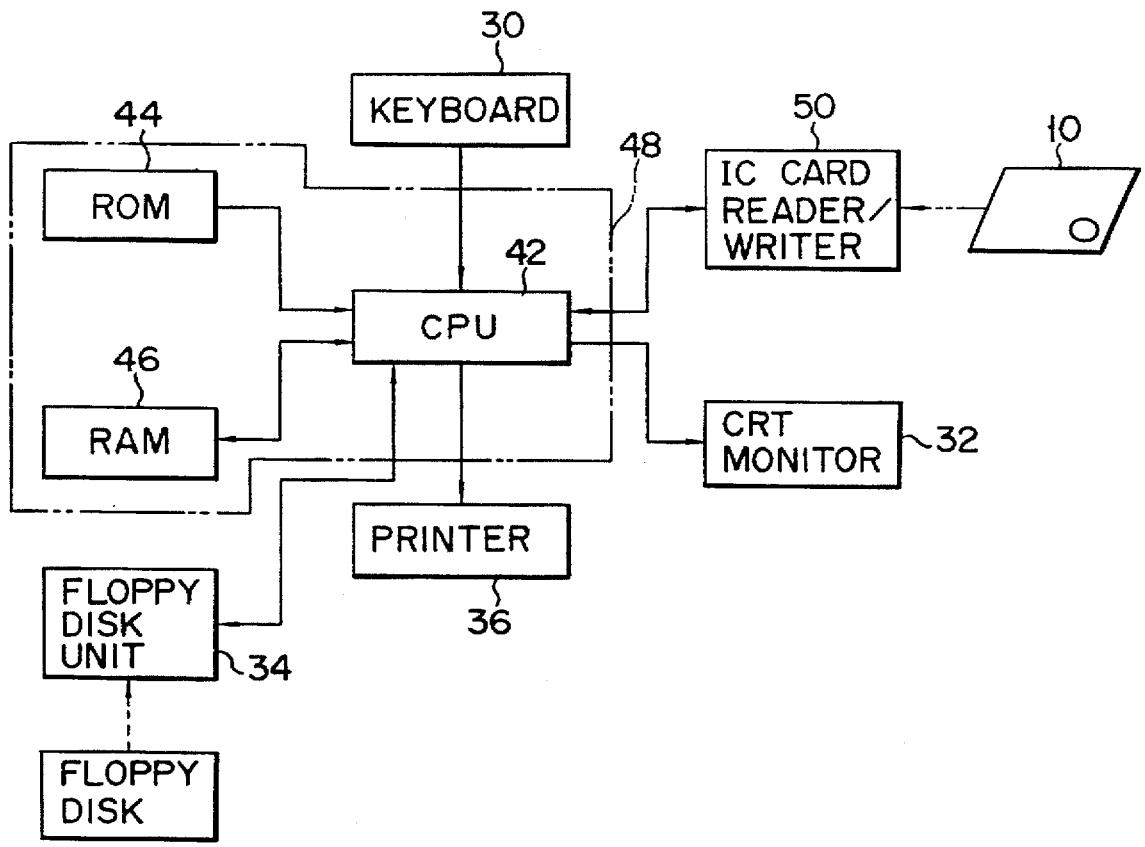
FIG. 4 shows a block diagram of a control circuit of the card issuing apparatus shown in FIG. 3.

The zone access table is programmed into the zone access controller 22 by the card issuer, for example, a bank, and not in the manufacturing stage of the IC card. A card issuing apparatus used for programming the zone access table will be described. FIG. 3 shows the appearance of a card issuing apparatus, which is like a general personal computer. The card issuing apparatus is comprised of a keyboard 30, a CRT monitor 32, a floppy disk unit 34, a printer 36, and the like. A slit 40 for the IC card to be inserted through is located under a disc inlet 38 of a floppy disk unit 34. FIG. 4 shows a block diagram of an internal circuit of the card issuing apparatus. The issuing operation of the card is performed under the control of a control circuit 48 including a CPU 42, a ROM 44 and a RAM 46. The keyboard 30, the CRT monitor 32, the floppy disk unit 34, and the printer 36 are connected to the CPU 42. The card 10, inserted through the slit 40, is electrically connected to an IC card reader/writer 50. With this connection, data is transferred between the circuit of the card 10 and that of the card issuing apparatus.

Figure 5:
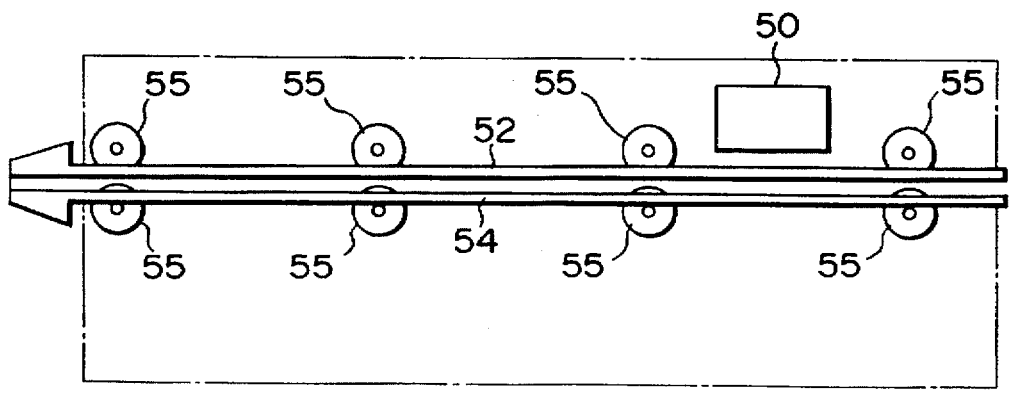
FIG. 5 is a longitudinal sectional view of a card transport path of the card issuing apparatus of FIG. 3 ranging from a slit for card insertion to a IC card reader/writer.

FIG. 5 shows a longitudinal cross sectional view of a card transport path ranging from the slit 40 to the IC card reader/writer 50. The transport path is a slit defined between a pair of upper and lower guides 52 and 54. Transport roller pairs 55, . . . are equidistantly disposed along the guides 52 and 54. The distance between the adjacent transport roller pairs 55 and 55 is equal to the length of the IC card as viewed in the card transport direction. With such an interval between the roller pairs, the card can be smoothly moved through the card transport path between the guides 52 and 54.

The card issuing operation of the card issuing apparatus thus arranged will be given below. An operator (as a card issuer) inserts a new IC card, on which the zone access controller 22 has not yet written a zone access table, into the slit 38. Then, the IC card is put into the card issuing apparatus and transported therein until the connector 12 is connected to a terminal (not shown) of the IC card reader/writer 50. When the connection is detected, the control circuit 48 directs the CRT monitor 32 to form a zone access table. More specifically, a zone No., a head address and a zone size in each zone are displayed on the CRT monitor 32 to request the operator to input an access person flag, a terminal flag, and an output condition flag. In response to the request, the operator inputs these flags. The flags as input are written, in the form of the above zone access table, into the zone access controller 22 of the IC card 10, through the CPU 42 and the IC card reader/writer 50 in the card issuing apparatus, and the CPU 20 in the card 10. Upon completion of the programming of the zone access table, an operator writes a password of an issuer and an owner into a predetermined memory area of the zone access controller 22. At this point, the card issuing operation is completed.

Generally, the IC card thus issued is owned by an owner, and is used at user terminals of banks (e.g. automatic cash depositing/withdrawing machine), for example, for depositing or withdrawing money. The user terminal also has, substantially, the same construction as that of the card issuing apparatus. The CPU of the user terminal is connected to a host computer through a data communication cable. At the user terminal, after insertion of the IC card, a password is input by an card owner. It is sequentially checked whether or not each zone is accessible by the user terminal and the owner. Then, only the accessible zones are open to use by the owner.

As described above, the memory area of the IC card is segmented into a plurality of zones in the stage of its manufacture. In each zone, the access condition can be set at the time of card issuance. Therefore, the IC card has greater versatility in use. The access condition may include an assortment of access people and a type of user terminal device as well, or a combination of them. Therefore, protection of the data can be ensured. In addition to the access condition, the way of encryption or the presence or not of the encryption can also be set. In this respect, the portable data storing/processing device of this embodiment has a good versatility in use.

A second embodiment of a portable data storing/processing device according to the present invention will be given. In the first embodiment, a password of the user must be given when the card is used. In the second embodiment, the IC card is usable with a terminal device requiring no password verification, that is, in cases where the access condition for each user is not necessary. This can be realized by modifying the zone access table as shown in Table 3.

TABLE 3

| Zone No. | Head address | Zone size | Access person flag A | Terminal flag B | Output condition flag C | Password verification flag D |
|---|---|---|---|---|---|---|
| 1 | 00000000 | 10 | 11000000 | 10000000 | 10000000 | 11000000 |
| 2 | 00000100 | 100 | 01100000 | 11100000 | 01000000 | 11100000 |
| 3 | 00001000 | 100 | 00100000 | 00100000 | 01000000 | 00100000 |
| 4 | 00001100 | 100 | ******** | 00100000 | 00000000 | 00000000 |
| ... | ... | ... | ... | ... | ... | ... |

The bits D1, D2 and D3 of a password verification flag D respectively correspond to a card maker, a card issuer and a card owner, as in the case of the bits of the access person flag A. If the bits of the password verification flag D are "1", the password verification for that person is required. If these are "0", no password verification for that person is required. The items other than the password verification flag are the same as those in Table 1. In Table 3, * indicates that either "0" or "1" is allowed for the bits. As seen from Table 3, the zones Nos. 1 to 3 require the inputting of a password since password verification must be performed. The zone No. 4 requires no password verification for any person.

In issuing the IC card in this embodiment, the zone No., the head address, and the zone size for each zone are displayed by the CRT monitor 32 as in the first embodiment to call upon an operator as a card issuer to input a access person flag, a terminal flag, an output condition flag, and a password verification flag. The access person flag, the terminal flag, the output condition flag, and the password verification flag as input from the keyboard 30 are programmed into the zone access controller 22 in the form of the above-mentioned zone access table, through the CPU 42, the IC card reader/writer 50, and the CPU 20 in the card 10.

The IC card requiring no password verification may be used as time cards for employees, tickets for playland, telephone cards, etc. If it is used as the ticket or telephone cards, the data representing a predetermined amount of money is stored in the memory. Every time it is accessed, the data of a necessary amount of money is subtracted from the previously stored data.

In the above-mentioned embodiments, individual EEPROMs are used for the memory and the zone access controller, respectively. A single EEPROM may be used for them. In this case, different addresses are assigned to them, respectively. Other memory components such as PROM, ROM, RAM, etc. may be used in place of the EEPROM. While the portable data storing/processing device is shaped like a card in the above-mentioned embodiments, the present invention may be embodied in a coin like configuration. Further, it is applicable for a ball point pen, a wrist watch, etc. Thus, any configuration is allowed for embodying the present invention, if it allows the portability of the device thus configured.

As described above, according to the present invention, a memory area is segmented into a plurality of zones. In each zone, any access condition can be set. Therefore, the portable data storing/processing device according to the present invention is versatile in use, and can reliably ensure data protection. This versatility allows a mass production of the portable data storing/processing devices, thus resulting in a cost reduction of the devices.

What is claimed is:

1. A method for issuing an integrated circuit IC card which includes a memory, said IC card issued by an IC card issuing apparatus and an IC card reader/writer, and which method enables use of said IC card, said method comprising the steps of:

a first step of inserting said IC card into said IC card read/writer coupled to said IC card issuing apparatus;

a second step of detecting an electrical connection between said IC card read/writer and said IC card inserted therein in the first step;

a step of dividing the memory of the IC card into a plurality of zones by writing zone data indicating, for each of the plurality of zones, a zone name designating the zone, a head address of the zone, and a size of the zone into the memory such that each of the plurality of zones includes a first memory means for storing data and a second memory means for storing a plurality of passwords and a plurality of access condition data corresponding to said plurality of zones, each of said passwords corresponding to each of a plurality of users and each of said access condition data respectively corresponding to each of said passwords, each said access condition data including a plurality of fields, said plurality of fields including a field for indicating whether the corresponding password is to be verified before data is read out or written into the first memory means of the corresponding zone and any of a plurality of fields for indicating an authorized user, for indicating an authorized access terminal, for indicating whether data read out from said first memory means is to be encrypted;

a third step of inputting to said IC card issuing apparatus, responsive to detection of said electrical connection, said access condition data for each of the plurality of zones, at least two of said plurality of fields in the access condition data for each zone indicating that a password corresponding to said field is to be verified;

a fourth step of writing into said second memory means the access condition data for each of the zones;

a fifth step of writing into the second memory means the passwords corresponding to said plurality of users;

a sixth step of, before data is read out or written into a given one of said zones after issue of said IC card in response to a user request, checking whether or not a field corresponding to that user in the access condition data stored in said second memory means indicates the password corresponding to that user is to be verified before data is read out or written into the given zone;

a seventh step of reading/writing data from/into said given zone without verification of the password, only when it is determined in the sixth step that the corresponding field in the access condition data indicates that the user's password does not need to be verified;

an eighth step of inputting an input password to said IC card when it is determined in the sixth step that the corresponding field in the access condition data indicates that the user's password needs to be verified;

a ninth step of determining whether the input password is identical with the password corresponding to the user stored in the second memory means; and a tenth step of reading/writing data from/into said given zone when the ninth step determines that the input password is identical to the user's password stored in the second memory means.

2. A method according to claim 1, in which said third step comprises a substep of inputting said access condition data indicating at least two passwords among said plurality of passwords may need verification, and said ninth step comprises a substep of reading/writing data when it is determined that at least one of the passwords which is indicated by the access condition data is identical to the password input to said IC card.

3. A method according to claim 2, in which said plurality of passwords include a password for a manufacture of the IC card, a password for an issuer of the IC card, and a password for an owner of the IC card.

4. A method according to claim 1, in which the third step comprises a substep of inputting said access condition data indicating at least one password among said plurality of passwords may need verification, and said ninth step comprises a substep of reading/writing data when it is determined that said at least one password which is indicated by the access condition data is identical to the password input to said IC card.

5. An integrated circuit card issuing system comprising: an IC card including:
  a) a first memory divided into a plurality of zones;
  b) a contact portion formed on a surface of said IC card, for enabling said IC card to be connected to an external apparatus;
  c) a second memory connected to store a plurality of passwords and a plurality of access condition data corresponding to said plurality of zones, each said password respectively corresponding to each of a plurality of users, each said access condition data including first, second, third, and fourth fields, said first field indicating whether the corresponding password is to be verified before data is read out or written into the corresponding zone of the first memory, said second field indicating an authorized user, said third field indicating an authorized access terminal, and said fourth field indicating whether data read out from said first memory is to be encrypted;
  d) a central processing apparatus for reading/writing data from/into said first memory in accordance with the information stored in said second memory; and
  e) an interface arranged between said contact portion and said central processing apparatus; and
  an IC card issuing means for issue of said IC card, said IC card issuing means comprising:
    a) receiving means for receiving said IC card by detecting a connection therewith;
    b) display means for displaying a message requesting an input operation when said IC card is received by said receiving means;
    c) input means, responsive to said receiving by said receiving means, for inputting said access condition data; and
    d writing means for writing into said second memory the plurality of access condition data after input by said input means and corresponding passwords;
said IC card storing a program for, before data is read out or written into a given one of said zones, checking the access condition data for the given zone stored in said second memory, and for, when said first field of the access condition data indicates that verification of the corresponding password is unnecessary, causing the data to be read out or written into the given zone without verification of the corresponding password, and for, when the access condition data indicates that verification of the corresponding password is necessary, causing said central processing unit to determine whether a password which is input by a user to said IC card is identical to the corresponding password indicated by said first field and causing the data to be read out or written into the given zone when said determination indicates that said passwords are identical.

6. A system according to claim 5, in which said input means comprises means for inputting said access condition data indicating at least two passwords among said plurality of passwords may need verification, and said central processing apparatus comprises means for reading/writing data when it is determined that at least one of the passwords which is indicated by the access condition data is identical to the password input to said IC card.

7. A system according to claim 6, in which said plurality of passwords comprises a password for a manufacture of the IC card, a password for an issuer of the IC card, and a password for an owner of the IC card.

8. A system according to claim 5, in which input means comprises means for inputting said access condition data indicating at least one password among said plurality of passwords may need verification, and said central processing apparatus comprises means for reading/writing data when it is determined that said at least one password which is indicated by the access condition data is identical to the password input to said IC card.

9. An integrated circuit card comprising:
  first memory divided into a plurality of zones in accordance with types of use of said IC card;
  a contact portion, formed on a surface of said IC card, for enabling said IC card to be connected to an external apparatus, a password being input to said IC card through said contact portion;
  second memory connected to store a zone name designating each of said zones, a head address of each of said zones, a size of each of said zones, a plurality of passwords and a plurality of password verification data, each of said passwords respectively corresponding to one of a plurality of users and each of said password verification data respectively corresponding to one of said zones, each said password verification data including a plurality of fields respectively corresponding to one of the passwords and one field in said plurality of fields for indicating verification of the corresponding password is necessary before data is read out or written into the corresponding zone of said first memory; and
  control means for permitting data to be read out or written into the given zone when the one field of the password verification data indicates that a verification of the corresponding password is necessary and when the corresponding password which is input to said IC card through said contact portion is identical to the corresponding password indicated by the one field of the password verification data.

10. A card according to claim 9, in which said second memory comprises means for storing access condition data indicating at least two passwords among said plurality of passwords may need verification, and said control means comprises means for reading/writing data when it is determined that at least one of the passwords which is indicated by he access condition data is identical to the password input to said IC card.

11. A card according to claim 10, in which said plurality of passwords comprises a password for a manufacture of the IC card, a password for an issuer of the IC card, and a password for an owner of the IC card.

12. A card according to claim 9, in which said second memory comprises means for storing access condition data indicating at least one password among said plurality of passwords may need verification, and said control means comprises means for read/writing data when it is determined that said at least one password which is indicated by the access condition data is identical to the password input to said IC card.

13. A card according to claim 9, wherein said second memory comprises:
  access person flag means for storing data in an authorized user field indicating whether a particular user corresponding to one of said passwords is permitted to access information stored in a zone of said first memory;
  terminal flag means for storing data in an authorized access terminal field indicating whether access to information stored in a zone of said first memory is permitted from a particular terminal device in which said IC card may be installed;

output condition flag means for storing data in an encryption field indicating whether access to information stored in a zone of said first memory is to be output using direct encryption, indirect encryption, or plaintext.

14. An IC card which can set an access condition for each of a plurality of memory zone, said IC card comprising:
   a) a memory, said memory comprising
      1) a plurality of memory zones for storing data,
      2) a memory area for storing a plurality of passwords, each of said passwords respectively corresponding to a plurality of users, and
      3) access control memory means for storing a plurality of password verification data, each said password verification data respectively corresponding to each said memory zone, each said password verification data including a plurality of fields respectively corresponding to one of the passwords and at least two fields in said plurality of fields for indicating verification of the identified password is necessary; and
   b) a microprocessor comprising means for accessing one of said memory zones when it is determined by the microprocessor that the corresponding one field of the password verification data indicates that verification of the corresponding password is necessary and a password input to the IC card is determined to be identical with the corresponding password identified by the one field of the password verification data.

15. An IC card in which access conditions for each of a plurality of memory zones can be set by an IC card issuing terminal, the IC card comprising:
   input means for inputting a password;
   a first memory connected to store data, said first memory including the plurality of memory zones;
   a second memory connected to store a plurality of passwords and a plurality of password verification data, said plurality of passwords respectively corresponding to a plurality of users, said plurality of password verification data respectively corresponding to said plurality of memory zones of said first memory, each of said plurality of password verification data specifying a password which is needed to be verified before data is read out or written into the corresponding zone of said first memory, and said plurality of password verification data being different from one another such that different passwords are needed to be verified for different memory zones of said first memory and being written by said IC card issuing terminal; and
   control means for accessing a memory zone of said first memory when a password which is input by a user to said IC card through said input means is identical to a password specified by the password verification data corresponding to the memory zone of said first memory to be accessed.

16. A method for issuing an integrated circuit (IC) card which includes a first memory divided into a plurality of zones for storing data and a second memory for storing a plurality of passwords respectively corresponding to said plurality of zones of said first memory, said IC card issued by using an IC card issuing apparatus and an IC card reader/writer, and which method enables use of said IC card, said method comprising:
   a first step of inserting the IC card into the IC card reader/writer coupled to the IC card issuing apparatus;
   a second step of detecting an electrical connection between the IC card reader/writer and the IC card inserted therein in the first step;
   a third step of inputting a plurality of password verification data to the IC card issuing apparatus, responsive to detection of the electrical connection, said plurality of password verification data respectively corresponding to the plurality of memory zones of the first memory, at least two of said plurality of password verification data specifying respective passwords which are needed to be verified, and said plurality of password verification data being different from one another such that different passwords are needed to be verified for different memory zones of the first memory and being written by the IC card issuing apparatus;
   a fourth step of writing into the second memory the password verification data for each of the zones; and
   a fifth step of writing into the second memory the passwords corresponding to said plurality of zones.

17. An IC card having a plurality of memory zones, the IC card comprising:
   input means for inputting a password;
   a first memory connected to store data, said first memory having first, second, and third memory zones;
   a second memory connected to store first and second passwords, and first, second, and third password verification data, said first and second passwords respectively corresponding to users, the first password verification data indicating that said first password is needed to be verified before said first memory zone of said first memory is accessed, the second password verification data indicating that said second password is needed to be verified before said second memory zone of said first memory is accessed and the third password verification data indicating that no password is needed to be verified before said third memory zone of said first memory is accessed; and
   control means for accessing the first or second zone of said first memory when a password which is input by a user to said IC card through said input means is identical to a password among the passwords stored in said second memory and specified by the first or second password verification data corresponding to the first or second memory zone of said first memory to be accessed and for accessing the third zone of said first memory in response to the third password verification data corresponding to the third memory zone of said first memory.

18. An integrated circuit card system comprising a card and an access terminal,
   a) said card comprising:
      1) an integrated circuit supported on said card, said integrated circuit comprising:
         i) a data memory storing a plurality of passwords, said data memory including a plurality of memory zones for storing data, and access condition memory means for storing a plurality of access condition data, each said password respectively corresponds to each of a plurality of users and each said memory zone, each said access condition data respectively corresponding to one of said passwords, and each said memory zone including a plurality of fields, one field in said plurality of fields for indicating an authorized access terminal, and
         ii) a microprocessor comprising means for accessing one of said memory zones when it is determined by the microprocessor that a password input by a user to said card is identical with the corresponding password stored in said data memory, and terminal identification data input by said access terminal to said card is determined to be identical with the corresponding authorized access terminal field; and 2) means for connecting said integrated circuit with said access terminal; and b) said access terminal comprising:

1) a card input means for receiving said card and for transmitting data to and receiving data from said integrated circuit, and 2) means for providing said terminal identification data to said integrated circuit.

* * * * *